(12) United States Patent
Golander et al.

(10) Patent No.: US 10,140,029 B2
(45) Date of Patent: *Nov. 27, 2018

(54) METHOD AND APPARATUS FOR ADAPTIVELY MANAGING DATA IN A MEMORY BASED FILE SYSTEM

(71) Applicant: NETAPP, INC., Sunnyvale, CA (US)

(72) Inventors: Amit Golander, Tel-Aviv (IL); Boaz Harrosh, Tel-Aviv (IL); Sagi Manole, Petah-Tiqwa (IL); Omer Caspi, Tel-Aviv (IL)

(73) Assignee: NETAPP, INC., Sunnyvale, CA (US)

( * ) Notice: Subject to any disclaimer, the term of this patent is extended or adjusted under 35 U.S.C. 154(b) by 300 days.

This patent is subject to a terminal disclaimer.

(21) Appl. No.: 14/565,473

(22) Filed: Dec. 10, 2014

(65) Prior Publication Data

US 2016/0170659 A1 Jun. 16, 2016

(51) Int. Cl.
*G06F 12/00* (2006.01)
*G06F 3/06* (2006.01)
*G06F 17/30* (2006.01)

(52) U.S. Cl.
CPC .......... *G06F 3/0611* (2013.01); *G06F 3/0644* (2013.01); *G06F 3/0673* (2013.01); *G06F 17/30091* (2013.01); *G06F 17/30182* (2013.01)

(58) Field of Classification Search
CPC ............. G06F 3/0611; G06F 17/30091; G06F 17/30182; G06F 3/0644; G06F 3/0673; G06F 12/0246
USPC ................................................. 711/103, 115
See application file for complete search history.

(56) References Cited

U.S. PATENT DOCUMENTS

| | | | |
|---|---|---|---|
| 5,860,141 A * | 1/1999 | Washington | G06F 12/0292 711/1 |
| 6,154,813 A | 11/2000 | Martin | |
| 6,490,671 B1 | 12/2002 | Frank | |
| 7,702,698 B1 | 4/2010 | Chakravarthy | |
| 8,402,226 B1 | 3/2013 | Faibish | |
| 8,549,230 B1 | 10/2013 | Chatterjee | |
| 8,843,459 B1 | 9/2014 | Aston | |
| 9,274,941 B1 | 3/2016 | Throop | |
| 2002/0083299 A1 | 6/2002 | Van Huben | |
| 2004/0098541 A1 * | 5/2004 | Megiddo | G06F 12/122 711/129 |
| 2005/0193160 A1 * | 9/2005 | Bhatt | G06F 12/0897 711/3 |
| 2006/0010169 A1 | 1/2006 | Kitamura | |

(Continued)

OTHER PUBLICATIONS

Joel Coburn. Adrian M. Caulfield, Ameen Akel. Laura M. Grupp, Rajesh K. Gupta. Ranjit Jhala, Steven Swanson; NV-Heaps: Making Persistent Objects Fast and Safe with Next-Generation. Non-Volatile Memories: Newport Beach. California. USA—Mar. 5-11, 2011: ACM New York. NY. USA: ISBN: 978-1-4503-0266-1.

*Primary Examiner* — Tuan V Thai
*Assistant Examiner* — Tasnima Matin
(74) *Attorney, Agent, or Firm* — Klein, O'Neill & Singh, LLP (57) ABSTRACT

Managing pages in a memory based file system by maintaining a memory into two lists, an Lr list and an Lf list, moving pages from the Lr list to the Lf list based on a repeated access pattern, and moving a page out of the Lr list or the Lf list arbitrarily, thereby enabling the two lists to re-grow according to current workload.

15 Claims, 10 Drawing Sheets

(56) References Cited

U.S. PATENT DOCUMENTS

| | | | |
|---|---|---|---|
| 2006/0026372 A1* | 2/2006 | Kim | G06F 12/08 |
| | | | 711/160 |
| 2006/0195485 A1* | 8/2006 | Bird | G06F 17/30359 |
| 2007/0266037 A1* | 11/2007 | Terry | G06F 3/0607 |
| 2009/0089781 A1 | 4/2009 | Shingai | |
| 2009/0265403 A1* | 10/2009 | Fukumoto | G06F 12/0246 |
| 2010/0281230 A1 | 11/2010 | Rabii | |
| 2010/0312955 A1 | 12/2010 | Hwang | |
| 2011/0010504 A1* | 1/2011 | Wang | G06F 12/0802 |
| | | | 711/129 |
| 2012/0023233 A1 | 1/2012 | Okamoto | |
| 2012/0059978 A1* | 3/2012 | Rosenband | G06F 3/0613 |
| | | | 711/103 |
| 2012/0143919 A1* | 6/2012 | Idicula | G06F 17/2247 |
| | | | 707/796 |
| 2012/0192186 A1* | 7/2012 | Bornstein | G06F 9/5011 |
| | | | 718/100 |
| 2012/0198121 A1* | 8/2012 | Bell, Jr. | G06F 12/0864 |
| | | | 711/3 |
| 2012/0254520 A1* | 10/2012 | Roh | G06F 12/0638 |
| | | | 711/103 |
| 2013/0080703 A1 | 3/2013 | Kumagai | |
| 2013/0138867 A1* | 5/2013 | Craft | G06F 12/0246 |
| | | | 711/103 |
| 2014/0281306 A1 | 9/2014 | Nakajima | |
| 2014/0304451 A1 | 10/2014 | Shibayama | |
| 2015/0212897 A1 | 7/2015 | Kottomtharayil | |
| 2015/0286436 A1* | 10/2015 | Olson | G06F 3/0619 |
| | | | 711/162 |

\* cited by examiner

METHOD AND APPARATUS FOR ADAPTIVELY MANAGING DATA IN A MEMORY BASED FILE SYSTEM

FIELD OF THE INVENTION

This invention relates to the field of data processing in memory based file systems and in particular to data management in a memory based file system.

BACKGROUND

Existing types of computer storage media include the hard disk drive (HDD) invented in the 1950's, the flash memory, which is a non-volatile computer storage medium, such as a solid-state drive (SSD), invented in the 2000's and the newly emerging persistent memory (PM) which is capable of storing data structures such that they can continue to be accessed using memory machine instructions (e.g. load/store) or memory application programming interfaces (APIs) even after the end of the process that created or last modified them and/or after a power failure. PM can be implemented through a nonvolatile media attached to the central processing unit (CPU) of the computer.

Unlike the earlier storage media, PM does not go through the CPU Input/Output (I/O) subsystem queue, and is characterized by low RAM-like latencies, so it is 1,000 to 100,000 faster per access than the flash and HDD memories respectively.

PM is implemented today using backed-up dynamic random access memory (DRAM) or magneto-resistive random-access memory (MRAM) or spin-transfer torque magnetic random-access memory (STT-MRAM) technologies. Other emerging technologies, such as resistive random-access memory (ReRAM) and phase-change memory (PCM) which are very dense, may enable cheaper, though slower, PM components.

Given the superior performance of the emerging fast PM and the lower cost of traditional storage and emerging slower PM, it makes sense to use both technologies to create a cost-efficient data storing solution.

Traditional file systems (e.g. XFS, ZFS, BTRFS) use block devices (e.g. HDD and/or SSD) as their storage media. Linux virtual file system (VFS) layer (and equivalents in other operating systems (OSs)) accelerate their performance by using volatile memory as a cache in front of such file systems. Volatile memory is also used in order to support methods of memory-mapped file I/O, such as the Linux system memory map system call (mmap( )).

Emerging PM-aware file systems (e.g. EXT4-DAX) directly access the PM, avoiding the slow and cumbersome caching and/or memory map services of the VFS layer. However, they all assume that the entire data set resides in a homogenous PM space.

The only file system that keeps hot data (data most accessed) in a volatile memory and colder data (data less accessed) in traditional storage devices is Linux TmpFS, which is, as its name indicates, a volatile file system designed for data that is temporarily useful, but not required for long term storage. TmpFS operates on virtual memory, and the underlying operating system always uses a least recently used (LRU) data management policy that is not unique for file systems and is not adaptive to the changing requirements of the workloads using it.

Adaptive replacement cache (ARC) is an adaptive replacement cache policy developed at IBM. ARC uses a fixed queue size which is rewarded according to cache hit, and which, as opposed to LRU, is an adaptive replacement cache. However, ARC does not operate at the file system level and thus is unaware of direct I/O access requests or system calls, such as mmap( )).

SUMMARY

Embodiments of the present invention provide an adaptive data management policy feasible in a memory based, possibly PM based, file system.

In one embodiment there is provided a method for managing pages in a memory based file system, the method including the steps of maintaining a memory into two lists, an Lr list and an Lf list, moving pages from the Lr list to the Lf list based on a repeated access pattern, and moving a page out of the Lr list or the Lf list arbitrarily, thereby enabling the two lists to re-grow according to current workload. In some embodiments the method may include applying a round-robin policy or a random policy for moving out pages from the Lr list and the Lf list.

In one embodiment the method may include maintaining a pool of free pages, the free pages to be allocated to either the Lr list or the Lf list, wherein the pool of free pages and the Lr list and the Lf list are included in a budget of relevant memory and wherein each of the Lr list or Lf list are capable of growing to about 100% of the budget.

In one embodiment the method includes adding more free pages from the pool to the Lr list than to the Lf list.

In one embodiment the method includes moving pages from the Lf list to the head of the Lf list based on a repeated access pattern.

In some embodiments the method includes adding new pages to the Lf list, the new pages including transparent pages. In some embodiments the Lf list may be exclusive for transparent pages.

In one embodiment the method includes providing protection for the transparent pages at a point after the Lf list. For example, in one embodiment the method may include maintaining the memory into a list (Lout) to receive at least pages moved out of the Lf list, and providing a point of protection in between the Lf list and the Lout list.

In some embodiments the method includes moving a page from the Lout list to the head of the Lf list based on a repeated access pattern.

Also provided is a method for managing transparent pages in a memory based file system. According to one embodiment the method includes the steps of maintaining in a memory a list L, adding transparent pages to the list L, and providing protection for the transparent pages at the tail or after the tail of the list L. In some embodiments non-transparent pages may also be added to the list L.

In some embodiments the method includes moving protected pages that have moved out of the list L, to the head of the list L.

In some embodiments the method includes maintaining a list (Lout) to receive pages moved out of the list L, wherein the point of protection for the transparent pages is prior to Lout.

In some embodiments the method includes moving pages from Lout to the head of the L list based on a repeated access pattern.

Further provided is an apparatus for use with a memory based file system. The apparatus may include a fast access storage device which includes a memory, a slower access storage device, and a processor to: maintain the memory into an Lr list and an Lf list, move pages from the Lr list to the Lf list based on a repeated access pattern, and move pages out of the Lr list or the Lf list arbitrarily, wherein pages moved out of the Lr list or the Lf list and which are not repeatedly accessed are moved from the fast access storage device in to the slower access storage device. The memory may include a non-volatile memory.

In some embodiments the processor is to maintain an Lout list to receive pages moved out of Lr and Lf, and provide protection for transparent pages at a point prior to Lout.

In some embodiments the processor is to move pages from Lout back to Lr or Lf based on a repeated access pattern.

BRIEF DESCRIPTION OF THE DRAWINGS

The invention will now be described in relation to certain examples and embodiments with reference to the following illustrative figures so that it may be more fully understood. In the drawings.

DETAILED DESCRIPTION

Embodiments of the invention relate to management of data. Data in a memory is managed in typically (but not necessarily) uniformly sized units known as pages. Although embodiments of the invention relate to management of data in all types and sizes of units, for simplicity's sake, reference will typically be made to "pages" when discussing data throughout the specification.

Different embodiments are disclosed herein. Features of certain embodiments may be combined with features of other embodiments; thus certain embodiments may be combinations of features of multiple embodiments.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

In typical databases and other data storing systems data may be stored in different types of storages based on access or predicted access patterns.

In one embodiment of the invention data is stored in system which includes a fast access storage device and a slower (and typically cheaper) access storage device, creating a cost-efficient data storing solution.

Figure 1A:
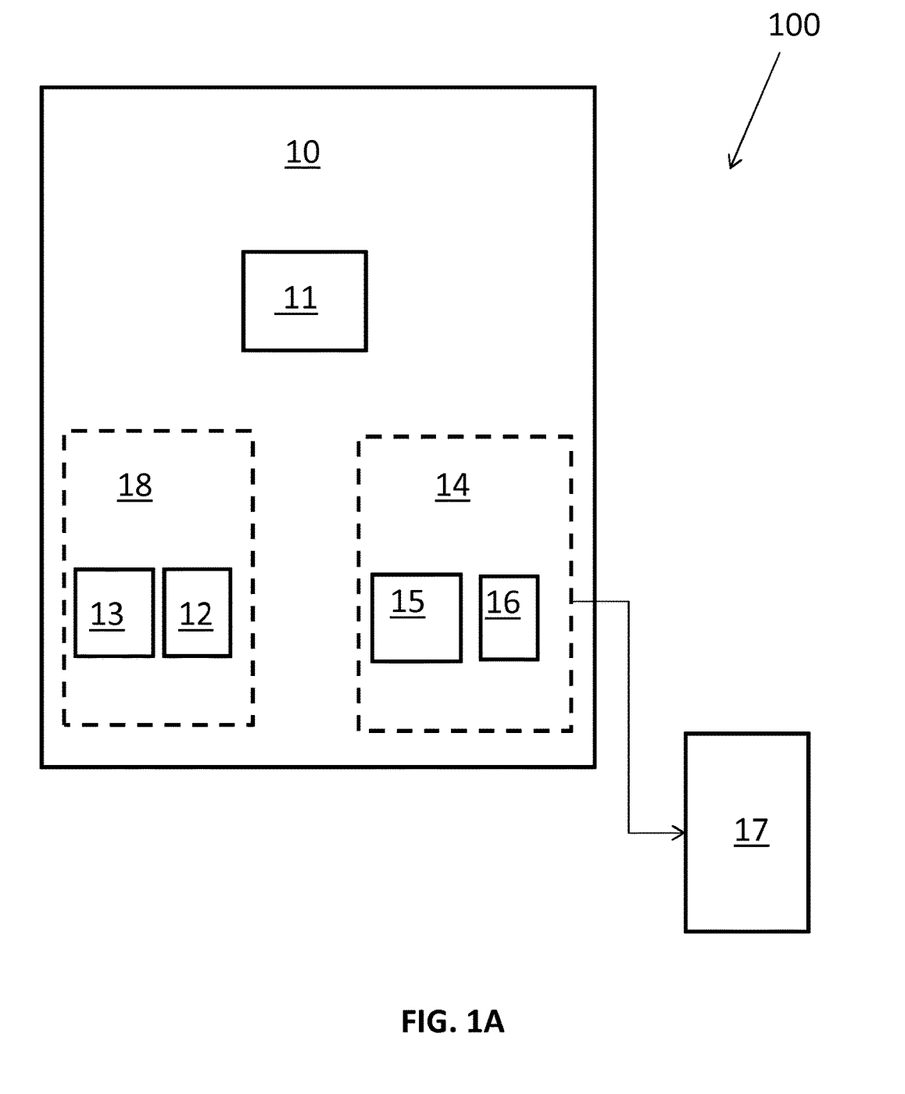
FIGS. 1A and 1B are schematic illustrations of a system according to embodiments of the invention.
Figure 1B:
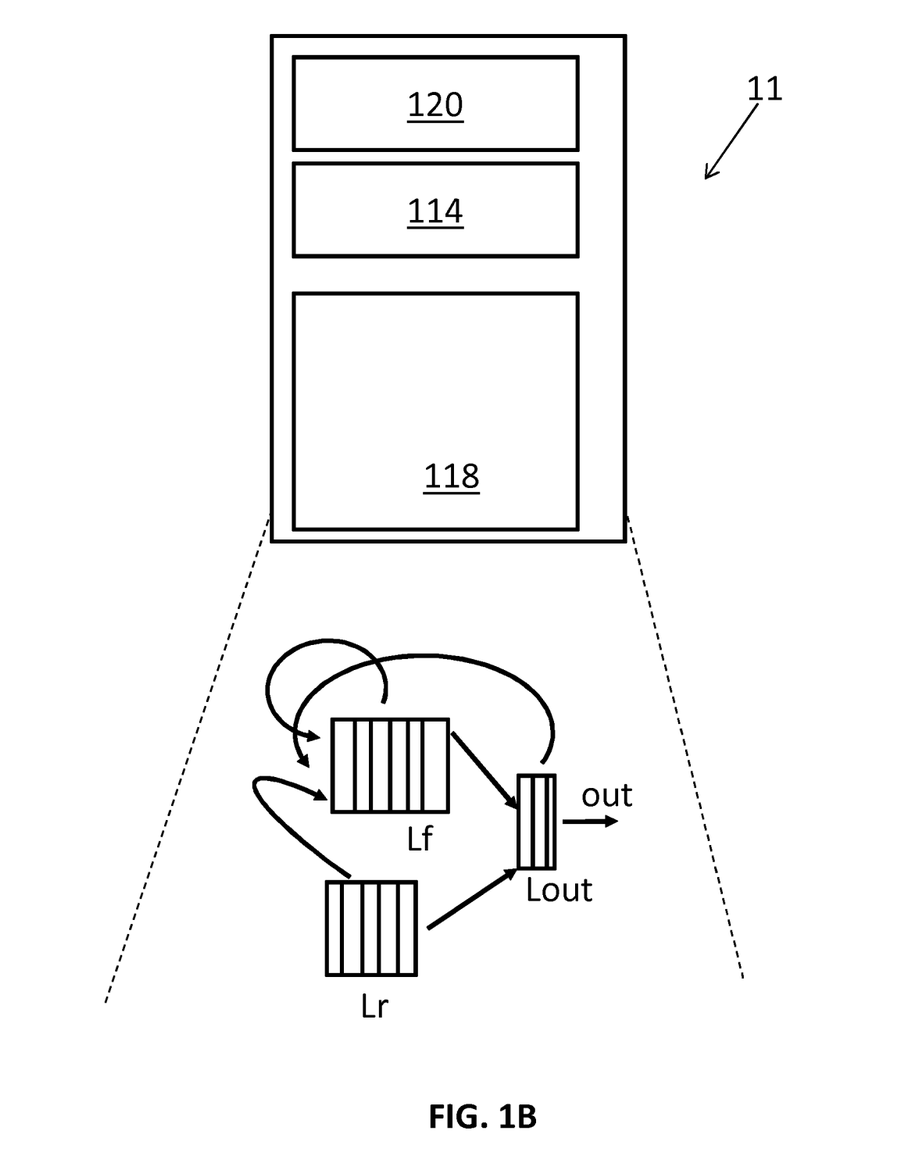

FIGS. 1A and 1B show an exemplary system according to embodiments of the invention.

FIG. 1A schematically illustrates an exemplary high-level architecture of a computer data storing system 100, which includes an apparatus for managing pages, for example, in a memory aware or memory based file system according to embodiments of the invention.

According to one embodiment the system 100 includes an apparatus such as a node 10 (e.g., a server) having at least one central processing unit (CPU) core 11 and which includes three types of storages, in one embodiment—three different storage devices, for storing "hot", "warm" and "cold" data, such as in pages.

In one embodiment the hot data storage, which may be a fast access storage device, includes one or more, memory types such as volatile memory 12 (e.g., volatile dual in-line memory module (DIMM)) and non-volatile memory 13 (e.g., non-volatile dual in-line memory module (NVDIMM), which may also be referred to as persistent memory (PM)). In this embodiment the warm data storage, which may be a slower access storage device, includes one or more storage elements, such as storage device 15 (e.g., SSD) and the cold data storage includes an over the network service system 17 (such as FC, FCoE, ISCSI, NFS, SMB, S3, Swift and other RESTful object services).

A fast access storage device may be, for example, 1,000 to 100,000 faster per access than a slower access storage device.

Other storage device types may be used according to embodiments of the invention.

System 100 may include a network interface card (NIC) 16 and possibly other peripherals (e.g., cards and/or chips) (not shown).

In embodiments of the invention "hot" data may be data most frequently and most recently accessed whereas "warm" data would typically be data accessed less recently and/or less frequently and "cold" data, accessed least recently and least frequently. For example, the system 100 may include 0.128 terabyte of PM for hot data, 4 terabyte of flash SSD for warm data and unlimited space in a remote service device for cold data. In this exemplary system an access pattern for hot data may include multiple requests (e.g., two requests) for a page within the past 10 minutes, warm data may be data accessed twice within the past week and cold data may be data that was last accessed weeks ago.

According to embodiments of the invention, when a page (or other unit of data) is requested and is not found in the hot data storage (e.g., in non-volatile memory 13 and/or volatile memory 12) the page or a copy of the page is typically moved from the warm data storage (e.g., storage device 15) or cold data storage (e.g., remote service system 17) if the data is stored there, to the hot data storage. If the hot data storage is full to capacity (typically a predefined maximum capacity), one or more pages should be moved out of the hot data storage before a new page or pages can be allocated for new data or moved in to the hot data storage from the warm data storage or cold data storage.

Methods according to embodiments of the invention manage the moving in/out or replacement of pages in or out of the hot data storage.

Although the hot data storage described in FIG. 1A includes two memory types, in some embodiments the hot data storage may include only one type of memory (e.g., only PM or only volatile memory). For example, use of only volatile memory in the hot data storage may be suitable for ephemeral computing (e.g. cloud computing) and other use cases.

Non-volatile memory 13 and volatile memory 12 are typically accessed by the CPU core 11 via a memory subsystem 18. Storage device 15 and NIC 16 are typically accessed by the CPU core 11 via an I/O subsystem 14. In some cases the storage device 15 may be accessed directly, or via another component, such as a host bus adaptor (HBA, for instance a SATA HBA), or via network (e.g. a shared block array).

The remote service system 17 may be in communication with the CPU 11 via NIC 16.

Referring to FIG. 1B, CPU 11 runs one or more applications 120 that use a file system 118 to store and retrieve data, typically through a standard interface 114, such as POSIX. File system 118, which may be stored in one or more storage devices (e.g., in non-volatile memory 13 and/or volatile memory 12 and/or in storage device 15), may use the components described in system 100 to store data, such as user data and its own meta data in memory/storage elements such as non-volatile memory 13 and/or in volatile memory 12 and/or in storage device 15 and/or in remote service system 17.

According to one embodiment data can be moved out of the non-volatile memory 13 and/or volatile memory 12 and stored in the storage device 15 and/or in the remote service system 17. According to one embodiment data predicted by the file system 118 to be hot (for example, prediction can be made based on access patterns e.g., how recently and/or how frequently the data has been accessed in the past hours or days) is kept in the non-volatile memory 13 and/or in volatile memory 12, whereas warm or cold data may be kept in storage device 15 and/or remote service system 17. For example, data predicted to be warm data may be moved from non-volatile memory 13 and/or volatile memory 12 to storage device 15 and data predicted to be cold data may be moved from non-volatile memory 13 and/or volatile memory 12 and/or from the storage device 15 to the remote service system 17.

In some embodiments non-volatile memory 13 and/or volatile memory 12 are part of a fast access storage device whereas storage device 15 is part of a slower access storage device. According to one embodiment data from storage device 15 and/or remote service system 17 may be moved back to non-volatile memory 13 and/or volatile memory 12 to enable fast access, e.g., low latency retrieval, of that data (e.g., upon repeated access). Other scenarios of distribution of data are possible according to embodiments of the invention. Methods for moving or replacing data according to embodiments of the invention will be described further below.

According to one embodiment the CPU 11 may execute a replacement policy or methods according to embodiments of the invention, which are typically optimized for memory aware file systems, as will be apparent from the description below.

Data may be managed in pages and the pages may be managed in lists of pages. A list, in the context of the invention, refers to a data structure consisting of a group of nodes which together represent a sequence having a beginning (head) and end (tail). Basically, each node may include data or a representation of data and includes a reference or link (e.g., a pointer or means to calculate a pointer) to the next node in the sequence. A list may be stored in memory.

I/O requests include a request for a page. The requested page may be a page previously accessed, or a new page (namely, a page that is not in a list) from, e.g., a pool of free pages, or a page made free through a recycling or re-claiming process. Typically, pages (either from the pool of free pages or recycled pages) are input to the head of a list and are pushed along the sequence towards the tail of the list by new pages entering the head of the list. Some lists may be managed as first in first out (FIFO). Other lists may be managed in a least recently used manner (LRU), which is further explained below. Once the memory is full, or a certain capacity threshold is crossed, one or more pages must be moved out of the memory before a new page or pages can be moved in. The pages moved out of the memory are typically the pages at the tail of the list.

Once a page is requested it may be moved to the head of the list when it is found and is then pushed through the list as new pages are added. This scheme, termed "least recently used" (LRU), ensures that the most recently used pages are at the head of the list thus staying in the memory at least until they reach the tail of the list where, as they are the least recently requested/used pages, they are removed from the list.

Another scheme, using methods according to embodiments of the invention, which may be referred to as "frequently used", is based on a repeated access pattern and may include moving a page to the head of the list once it is requested and moving the page out of the list and back to the head of the list once the page is requested again. This scheme "encourages" frequently used pages to be kept in the list (hence in the memory) the longest since the frequently accessed pages keep on being moved to the head of the list, away from the tail of the list.

In one embodiment of the invention a memory is maintained into two lists, one list for pages that were accessed once (Lr) and another list that includes pages that were accessed more than once (Lf).

According to one embodiment a process on CPU 11 maintains a hot data storage, (e.g., memory of the system, such as non-volatile memory 13 and/or volatile memory 12) into an Lr list and an Lf list; moves pages from the Lr list to the Lf list based on a repeated access pattern; and moves pages out of the Lr list or the Lf list arbitrarily.

Pages arbitrarily moved out of the Lr list or the Lf list may be moved directly out of the memory e.g., into storage device 15 or remote service system 17.

In another embodiment an additional list, Lout, may be maintained in the hot data storage and pages moved out of Lr and/or Lf may be moved into the Lout list, keeping them in the hot data storage a while longer, namely, the additional time it takes these pages to move through Lout. In this embodiment these pages are moved into storage device 15 or remote service system 17 only after moving through and out of Lout.

In the context of the invention the term "data" and/or "page" may include representation of data such as file system metadata, as well as the data itself. Also, a list may include pages or only descriptors (e.g., pointers) of pages whereas the pages themselves may be kept elsewhere.

In one embodiment lists can be implemented in one type of memory (e.g., volatile memory 12) but describe pages kept in another type of memory (e.g., non-volatile memory 13).

Several applications request the file system to map a portion of the stored data to memory (e.g. via a POSIX mmap system call) and then try to access it directly via machine level instructions. Traditional file systems typically leverage the VFS page cache, so that they copy the data from the file system to the page cache and let the VFS manage its volatile memory and serve the application.

In one embodiment file system 118 is a memory based or memory aware file system, i.e., which enables direct memory access by applications with memory-mapped I/O directly to the data it holds rather than to a cache.

Direct I/O using machine instruction code is typically unnoticed by software such as the file system 118 (which notices indirect read and write system calls). For direct I/O requests the file system 118 creates a new mapping in the virtual address space of the calling process that can now use the memory directly with machine instructions, such as load and store, and without going through the interface 114, e.g., POSIX system calls. Direct accesses to mmaped pages, after the first access, are "transparent" to the file system 118 (making a page become transparent). However, memory protection, typically used to prevent a process from accessing memory that has not been allocated to it, can be used according to embodiments of the invention, to gain file system visibility (make the page non-transparent) in order to enable accessing an otherwise transparent page.

Methods according to embodiments of the invention operate at the file system 118 level and are thus responsible for serving the initial direct I/O request and turning the requested pages to transparent (i.e. by adding the proper mapping to the process's page table). Providing visibility to transparent pages (also referred to as "protection") may be done for example by adding a transparent page flag to each page (or descriptor) that becomes transparent due to an mmap request and/or a consecutive page fault, and for such marked transparent page—revoke the relevant entry from the process page table (and its hardware cache commonly called translation lookaside buffer (TLB)), meaning that a new page fault will be issued if the user process tries to access the page again, thereby protecting the page, namely, making it non-transparent to the file system.

In some embodiments, which will be further described below, a point of protection is provided for pages prior to the pages leaving the hot data storage so that repeated requests for transparent pages may be noticed by the file system 118 and transparent pages may be correctly characterized as hot, warm or cold based on a repeated access pattern.

In one embodiment system 100 includes a software programming code or computer program product that is typically embedded within, or installed on a computer. Alternatively, components of system 100 can be stored in a suitable storage medium such as, a CD, a drive (e.g., HDD, SSD, DOM), memory stick, remote console or like devices.

The exemplary design of system 100 presents an apparatus that implements a new replacement policy; however other systems may carry out embodiments of the present invention.

Embodiments of the invention may include an article such as a computer or processor readable non-transitory storage medium, such as for example a memory, a drive, or a USB flash memory encoding, including or storing instructions, e.g., computer-executable instructions, which when executed by a processor or controller, cause the processor or controller to carry out methods disclosed herein.

Figure 2A:
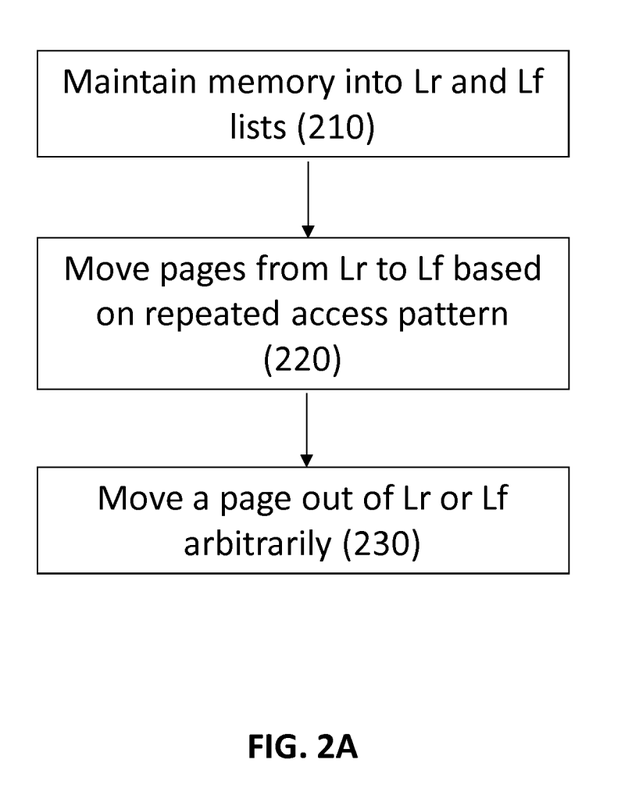
FIGS. 2A, 2B and 2C are schematic illustrations of a method for adaptively managing pages in a memory based file system, according to embodiments of the invention.
Figure 2B:
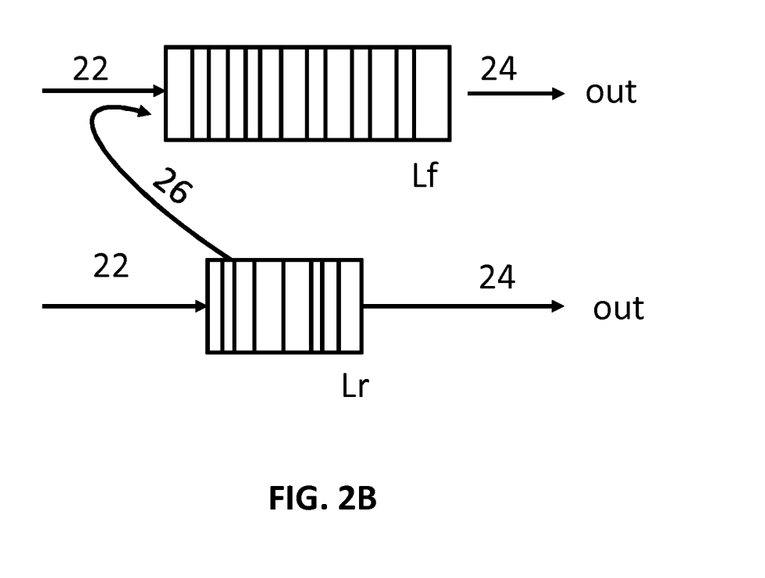
Figure 2C:
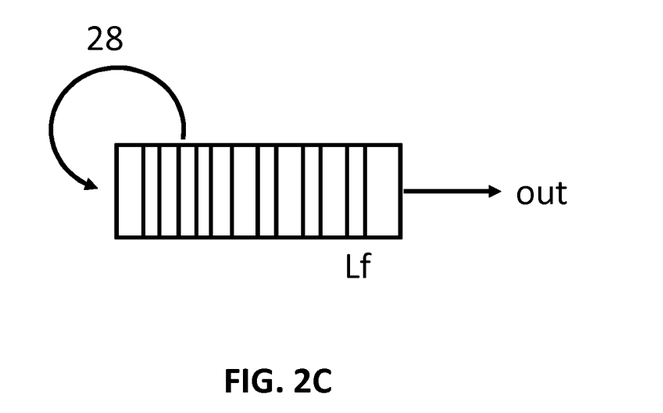

Methods for adaptively managing pages in a memory based or memory aware file system, such as file system 118, according to embodiments of the invention, are schematically illustrated in FIGS. 2A-C.

According to one embodiment which is schematically illustrated in FIG. 2A, the method includes maintaining a memory into two lists, an Lr list and an Lf list (210); moving pages from the Lr list to the Lf list based on a repeated access pattern (220); and moving a page out of the Lr list or the Lf list arbitrarily (230).

The Lr list is typically for pages that were accessed recently (e.g., while they are still in the list) once (recently used) and the Lf list is typically for pages that were accessed twice or more (frequently used). In embodiments schematically shown in FIGS. 2B and 2C, a hot data storage, e.g. including a memory such as non-volatile memory 13 and/or volatile memory 12, is maintained into a recently used list (Lr) and a frequently used list (Lf). Arrows indicate the movement of pages through the lists. Once a page is requested it is typically moved to the head of a list, as demonstrated by arrows 22, to the head of either Lr or Lf. The page is then pushed through the list as additional pages are added to the head of the list. By construction, as described above, the page (or pages) at the tail of the list is the least recently used and will eventually be moved out of the list (as demonstrated by arrows 24) and possibly, eventually, out of the hot data storage.

According to one embodiment which is schematically illustrated in FIG. 2C, a page may be moved through Lf based on a repeated access pattern, namely, if the page is requested again while it is in Lf it will be moved out of its place in Lf to the head of Lf, as demonstrated by arrow 28. If the page is not re-accessed it will be pushed to the tail of Lf and will be moved out of Lf and possibly, eventually out of the hot data storage.

By way of example, consider page X as it moves through the hot data storage. Once page X is accessed (for example, a newly requested or accessed page) it is moved to the head of the Lr list (as demonstrated by arrow 22 in FIG. 2B) and is pushed through the Lr list to the tail of the list. Unless page X is accessed again it will eventually be moved out of the Lr list (as demonstrated by arrow 24 in FIG. 2B) and out of the hot data storage. If page X is accessed again while it is still in Lr it will be moved out of Lr to the head of the Lf list (as demonstrated by arrow 26 in FIG. 2B). Page X will now be pushed through the Lf list to the tail of the list. Unless page X is accessed again it will eventually be moved out of the Lf list (as demonstrated by arrow 24 in FIG. 2B) and out of the hot data storage. However, if page X is repeatedly accessed (e.g., accessed twice) before reaching the tail of Lf, it will be moved to the head of Lf (as demonstrated by arrow 28 in FIG. 2C) and again start being pushed through Lf. In this case the repeated access for page X encourages page X to be kept in the hot data storage longer than if there was no repeated request for page X.

The schemes described in FIGS. 2B and 2C encourages the most frequently used pages to be kept in the hot data storage the longest.

When new pages are required but there are no free pages (e.g., a pool of free pages is empty), there is a need to reclaim resources. One objective of processes according to embodiments of the invention is to choose pages to be reclaimed. Pages moved out of Lr and Lf may be reclaimed.

According to embodiments of the invention pages are moved out of Lr or Lf arbitrarily. In one embodiment a round-robin policy may be applied for moving pages out from Lr or Lf to achieve moving pages out of Lr or Lf arbitrarily. In another embodiment a random policy may be applied for moving pages out from Lr or Lf to achieve moving pages out of Lr or Lf arbitrarily. Other known policies may be used to achieve moving pages out of either Lr or Lf arbitrarily.

In some embodiments the policy used may be weighted, for example, by the size of the list. For example, a method may include using a random policy to remove pages from Lr or Lf arbitrarily while providing a 60% chance for pages to be removed from Lr and only 40% chance for pages to be removed from Lf.

Figure 3:
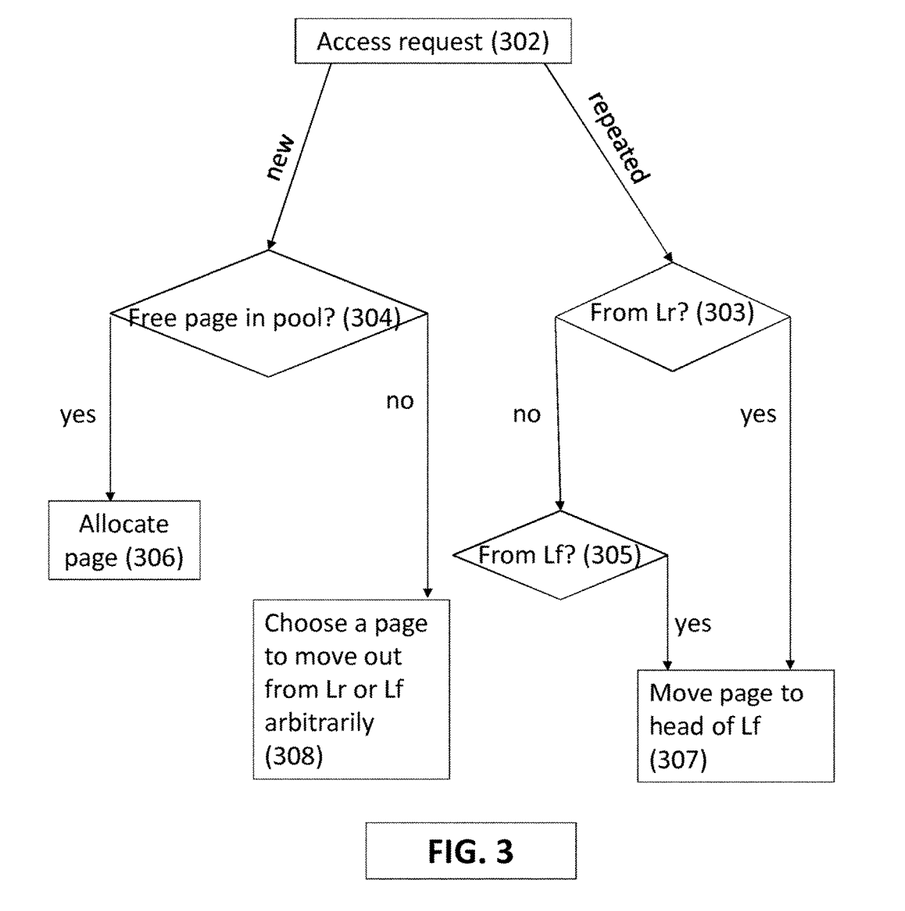
FIG. 3 is a schematic illustration of a method for adaptively managing pages according to a workload.

Moving pages out of either Lr or Lf arbitrarily puts pressure on both lists to shrink and enables them to re-grow according to current workload (e.g., new access patterns that characterize the workloads being run at the moment). Such adaptive page management is schematically illustrated in FIG. 3.

In one embodiment, once there is a request to access a page (302) it is determined whether the request is for a new page (e.g., a page not in any list) or whether the request is for repeated access. If the request is a repeated request for a page already in the Lr or Lf lists it is determined whether the page is in the Lr list (303). If the page is in Lr then the page is moved to the head of Lf (307), for example, as shown by arrow 26 in FIG. 2B. If the page is not in Lr then it is determined if the page is in Lf (305). If the page is in Lf then, based on the request to access this page again, the page is moved to the head of Lf (307), for example, as shown by arrow 28 in FIG. 2C.

The hot data storage, e.g., which includes a memory, may include a pool of free pages (which may be maintained as a separate list, as part of existing lists (e.g., at the tail of Lr and/or Lf) or as any other arrangement of pages) as well as other lists in addition to the Lr and Lf lists (as further described below). In one embodiment the relevant memory (memory available for pages managed according to embodiments of the invention) which may also be termed "budget" or "budget of relevant memory", includes, in addition to Lr and Lf (and possibly other lists maintained in the memory), a pool of free pages that are to be allocated to either the Lr list or the Lf list. If there is an access request for a new page, the pool of free pages is examined to see if there is a free page (304). If there is a free page (e.g., in the pool) then a page is allocated (306). However, if there are no free pages are available a page (one or more) must be moved out of the memory to allow room for a new page (one or more). According to embodiments of the invention moving a page or pages out of the memory is done by moving a page (or pages) out of Lr or Lf arbitrarily (308).

As will be described below, the size of lists maintained in the memory (e.g., the Lr and/or Lf lists) is flexible such that each list can grow or shrink on the expense of the other list and/or on the expense of the pool of free pages. Moving pages out from either Lr or Lf arbitrarily allows the workload to dictate the movement of pages through the lists enabling management of the pages which is adaptive to the workload.

According to one embodiment a memory is maintained into Lr, Lf and the pool of free pages and the budget constitutes the Lr list, the Lf list and the pool of free pages. According to one embodiment each of the Lr list or Lf list are capable of growing to about 100% of the budget.

Figure 4:
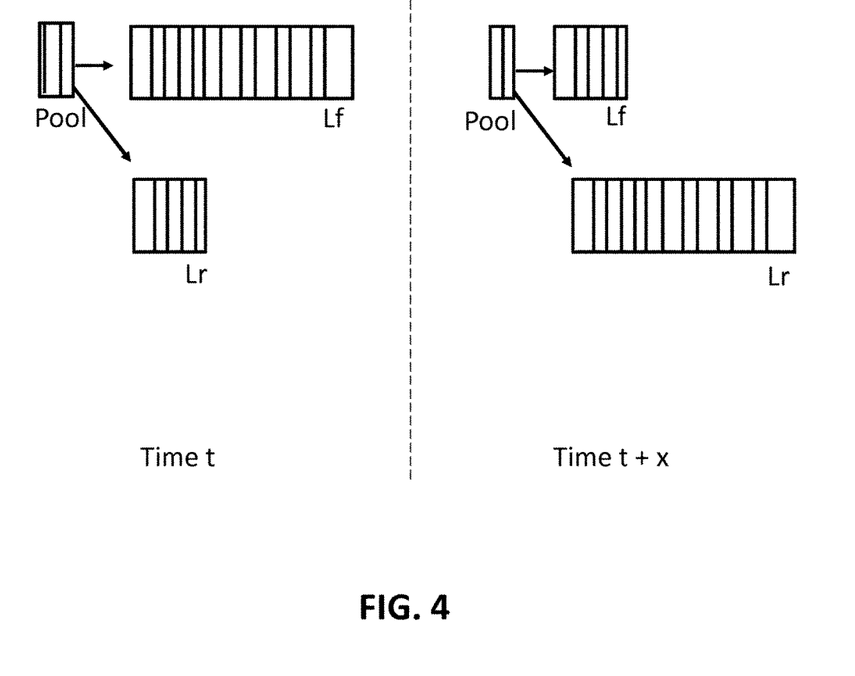
FIG. 4 is a simplified diagram showing different possible configurations of the budget of the relevant memory, according to embodiments of the invention.

FIG. 4 is a simplified diagram showing different possible configurations of the budget, according to embodiments of the invention.

The budget may be described by the following formula $$|Free\_Pages| + |Lr| + |Lf| == 100\% \text{ of relevant memory}$$

in which Free_Pages stands for the pool of free pages (which may be maintained as an independent list/s, a suffix of another list/s or as any other arrangement of pages). Each of the components in the formula stands for the number of pages represented in the specific list. The components are not rigid such that it is possible for each of them to be almost or about 100% of the budget at a given time.

The Free_Pages component may initially be of a predetermined size, typically close to 100% of the budget, but is usually depleted quickly and then maintained in its small size. In some embodiments an empty or depleted pool may mean a pool that has reached a predetermined threshold, e.g., 1% of the relevant memory. Pages are moved into Lr and Lf, usually as dictated by the workload, either from the pool of free pages or from Lr and Lf themselves, according to a repeated access pattern, as described above.

In the exemplary embodiment schematically illustrated in FIG. 4, at time t the Lf list is smaller (contains less pages) than the Lr list, a scheme typical, for example, to a workload that does not usually perform repeating accesses such as a movie player. However, as data is accessed repeatedly Lf grows because pages are being moved into Lf from both Lr and from Lf itself. Thus, at time t+x Lf may be larger than Lr. Such a scenario can be driven, for example, by a database workload.

With typical workloads that require new pages, the lists are under pressure to drain, in order to supply new pages, so their size is mainly determined by the amount of new pages entering each list, which is determined by the workloads.

In one embodiment the method includes adding more (or even all) free pages from the pool to the Lr list than to the Lf list, for example, to compensate for a workload which includes applications requiring many repeated accesses.

In some embodiments new pages may include transparent pages (e.g., as a result of a request for direct I/O access) and transparent pages may be added to a list, e.g., the Lr list, Lf list or any other list.

According to one embodiment, following a direct access request a transparent page may be moved into either Lr or Lf. If this transparent page is directly accessed again, while it is in Lr or Lf, this request will go unnoticed by the file system and the page will not be moved to the head of the Lf list as it should be, based on the repeated access. This page will therefore be moved out of the hot data storage earlier than it should, based on the repeated access, erroneously being treated by the system as warm or cold.

According to one embodiment of the invention a point of protection is provided for transparent pages before they are moved out of the hot data storage. Being protected means the page becomes non-transparent enabling repeated accesses to this page to be noticed by the file system.

Figure 5:
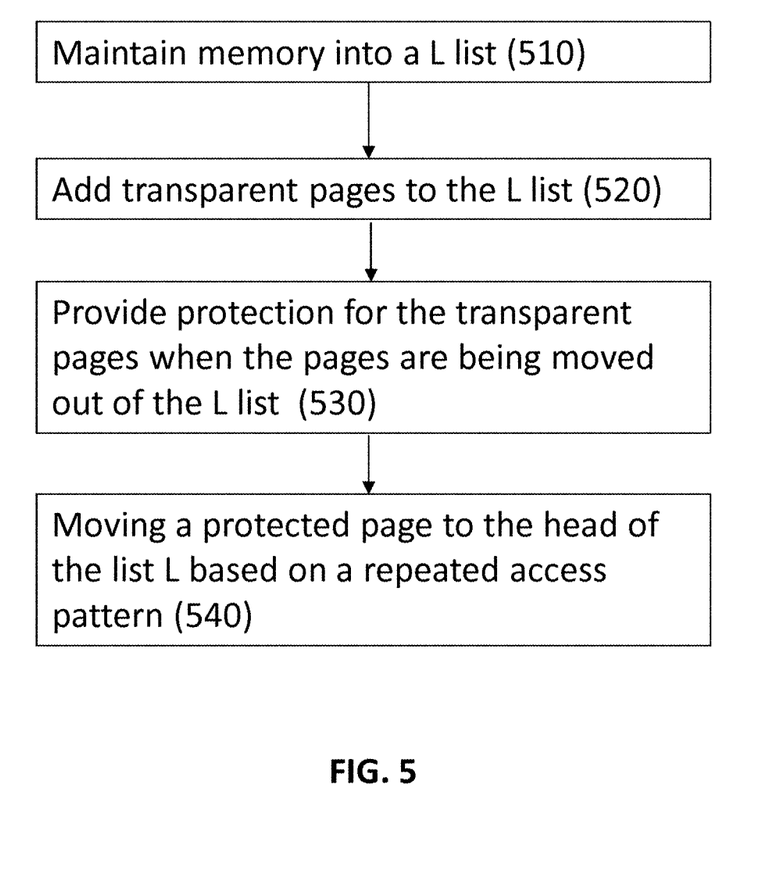
FIG. 5 is a schematic illustration of a method for adaptively managing transparent pages in a memory based file system according to embodiments of the invention.

A method for adaptively managing transparent pages in a memory based file system according to embodiments of the invention is schematically illustrated in FIG. 5. The method may include maintaining a memory into a list (L) (510) into which transparent pages may be added (520). List L may be exclusive for transparent pages or may have non-transparent pages added to it as well.

According to one embodiment protection is provided at a point when the pages are being moved out of the list L (530), e.g., at the tail or after the tail of the list L, at a protection point. A page being moved out of the list L, passing through the protection point, is now non-transparent (also termed "protected") and repeated accesses to this page can now be noticed enabling the protected page to be moved to the head of the list L based on a repeated access pattern (540).

Figure 6:
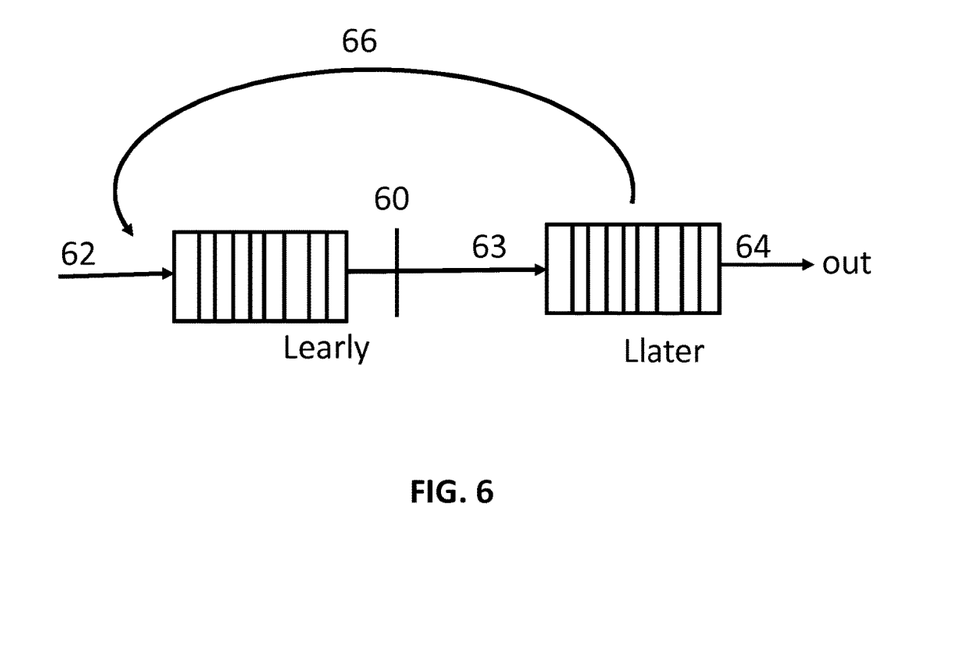
FIG. 6 is a simplified diagram showing a method which includes moving transparent pages through an early list and later list having a point of protection between the early list and later list, according to embodiments of the invention.

An exemplary embodiment is schematically illustrated in FIG. 6. In this example a memory is maintained into two lists Learly and Llater, Learly being earlier in the sequence than Llater. Transparent pages may be moved to the head of Learly (as demonstrated by arrow 62) and may then be moved through Learly, for example, in an LRU scheme as described above and into Llater (as demonstrated by arrow 63). However, a point of protection 60 is provided in between Learly and Llater (e.g., at the tail or after the tail of Learly). Thus, a transparent page added to Learly will be moved out of Learly without accounting for repeated accesses to the transparent page. However, since this page becomes visible (non-transparent) at point of protection 60, before moving into Llater, repeated access to this page in Llater can be noticed by the file system enabling to manage these two lists in a way similar to a single LRU list allowing for repeatedly accessed pages to be retained in the hot data storage longer, even for transparent pages.

Protecting a transparent page (e.g. in protection point 60) may be done for example by adding a transparent page flag to transparent pages, as described above.

Thus, the method according to one embodiment may include moving an initially transparent but now protected page from a later list (e.g., Llater) to an earlier list (e.g., Learly), based on a repeated access pattern. If no or little repeated access requests are made for a (now protected) page that page will eventually be moved out of the Llater list as demonstrated by arrow 64.

In one embodiment, repeating requests for pages from Llater may cause pages to be moved to the head of Learly, as shown by arrow 66. In another embodiment (not shown) repeating requests for pages from Llater may cause pages to be moved to the head of Llater.

Figure 7:
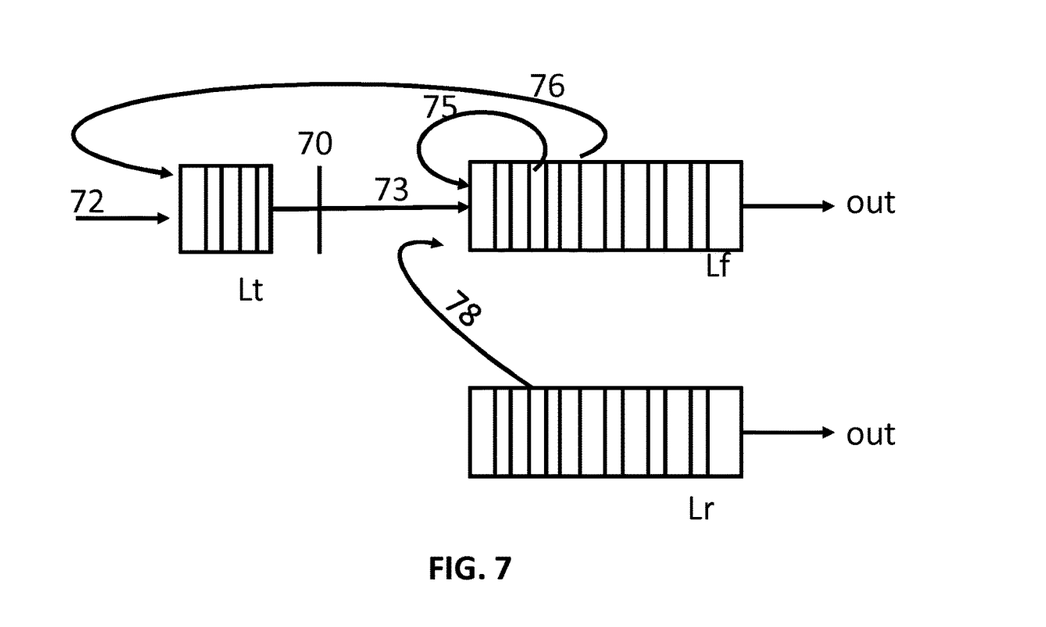
FIG. 7 is a simplified diagram showing a method which includes moving transparent pages through an early list and later list having a point of protection between the early list and later list, according to another embodiment of the invention.

Another exemplary embodiment is schematically illustrated in FIG. 7. In this example a memory is maintained into a list for transparent pages (Lt) and Lf and Lr which have been described above. Transparent pages may be moved to the head of Lt (as demonstrated by arrow 72) and may then be moved through Lt (for example as described above in an LRU manner, in a FIFO manner or any other list implementation) and into Lf (as demonstrated by arrow 73). A point of protection 70 is provided (for example as described with reference to protection point 60 in FIG. 6) in between Lt and Lf, e.g., at the tail or after the tail of Lt. Thus, a transparent page added to Lt will be moved out of Lt without accounting for repeated accesses to the transparent page but since this page becomes visible (non-transparent) at point of protection 70, before moving into Lf, repeated access to this page in Lf can be noticed by the file system enabling to move pages repeatedly accessed in Lf to the head of Lf, as demonstrated by arrow 75.

Pages may be moved into Lf from Lr, as demonstrated by arrow 78, based on a repeated access pattern. In one embodiment, repeating requests for pages from Lf may cause pages to be moved to the head of Lt, as shown by arrow 76. Pages are moved out of Lf and Lr as described above.

Figure 8:
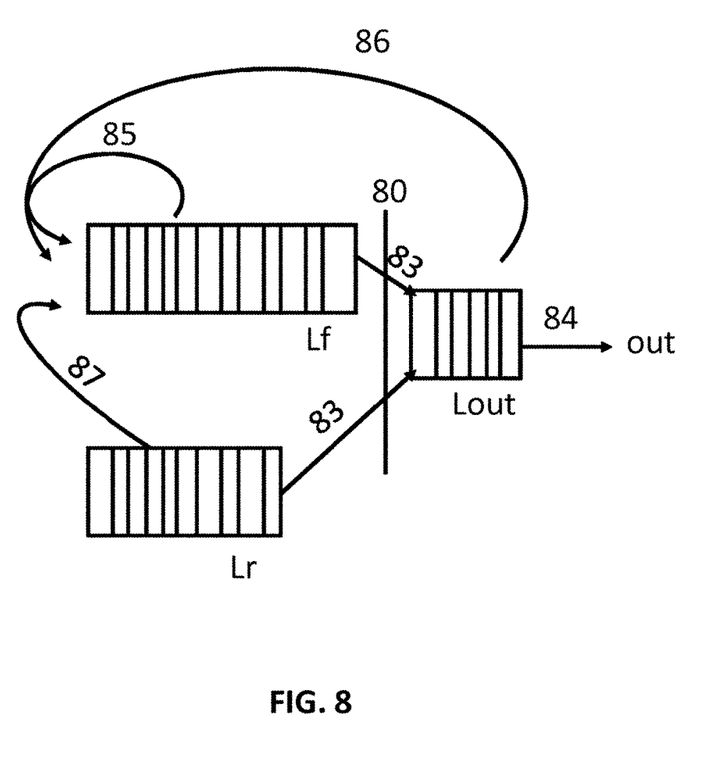
FIG. 8 is a simplified diagram showing a method for adaptively managing transparent pages in a memory based file system using an Lout list, according to one embodiment of the invention.

In an alternative embodiment, an example of which is schematically illustrated in FIG. 8, the hot data storage (e.g., which includes a memory) is maintained into an Lout list in addition to Lr and Lf. Lout is typically located later in the sequence of lists and is for receiving pages moved out from earlier lists, (e.g., lists Lr and/or Lf).

In one embodiment new transparent pages are added to Lf and non-transparent pages (new or repeatedly requested pages) are added to Lr. In this embodiment pages may be moved into Lf from Lr, as demonstrated by arrow 87, based on a repeated access pattern. Pages moving through Lr and Lf which are not accessed again will be moved out from Lr and Lf to Lout as demonstrated by arrows 83.

Transparent pages may be moved through Lf following an LRU scheme, without being noticed by the file system, however a point of protection 80 is provided (for example as described with reference to protection point 60 in FIG. 6) at a point after Lf, prior to the head or at the head of Lout. Thus, a transparent page moved through Lf or Lr is moved out of Lf or Lr without accounting for repeated accesses but since this page becomes visible at point of protection 80, before moving into Lout, repeated access to this page in Lout can be noticed by the file system enabling to move pages repeatedly accessed in Lout to the head of Lf, as demonstrated by arrow 86. Repeated access to non-transparent pages in Lf are noticed by the file system enabling to move pages repeatedly accessed in Lf to the head of Lf, as demonstrated by arrow 85.

If no or little repeated access requests are made for a (now protected) page in Lout that page will eventually be moved out of Lout as demonstrated by arrow 84. Pages moved out of Lout are typically moved out of the memory, for example, into a storage device (e.g., storage device 15) and become warm data as opposed to hot data.

Figure 9:
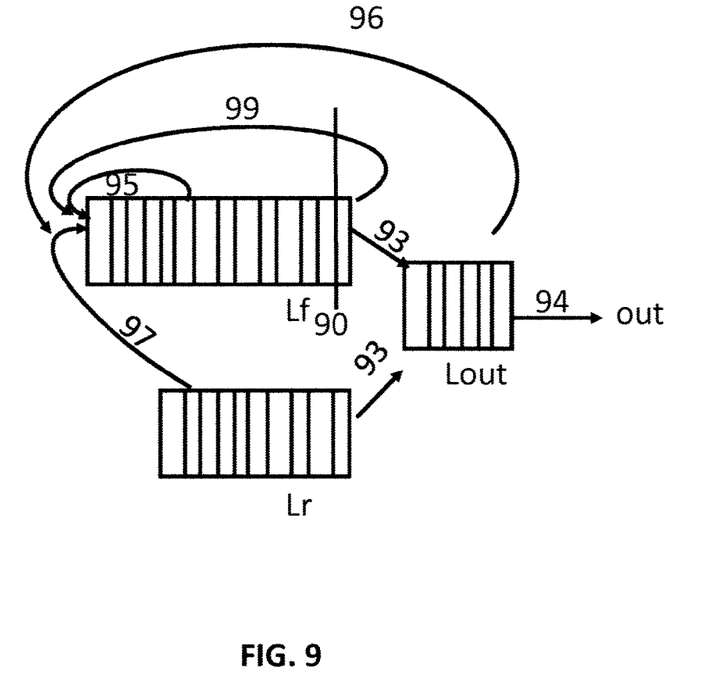
FIG. 9 is a simplified diagram showing a method for adaptively managing transparent pages in a memory based file system using an Lout list, according to another embodiment of the invention.

In another embodiment, an example of which is schematically illustrated in FIG. 9, the hot data storage (e.g., which includes a memory) is maintained into an Lout list in addition to Lr and Lf, as described above.

New transparent pages may be added to Lf and non-transparent pages (new or repeatedly requested pages) may be added to Lr. In this embodiment pages may be moved into Lf from Lr, as demonstrated by arrow 97, based on a repeated access pattern. Pages moving through Lr and Lf which are not accessed again will be moved out from Lr and Lf to Lout as demonstrated by arrows 93.

Transparent pages may be moved through Lf, without being noticed by the file system, however a point of protection 90 is provided (for example as described with reference to protection point 60 in FIG. 6) at the tail of Lf or immediately after the tail of Lf. Thus, a transparent page is moved through Lf without accounting for repeated accesses but at point of protection 90 the page is checked for transparency (e.g., checking for a flag or mark on the page's descriptor) and if the page is transparent it is protected and moved to the head of Lf, as demonstrated by arrow 99, enabling the now protected page more time in the hot data storage to prove itself as still being used. If the page is not transparent it is moved from Lf to Lout as demonstrated by arrow 93.

Repeated access to a non-transparent page in Lout can be noticed by the file system enabling to move pages repeatedly accessed in Lout to the head of Lf, as demonstrated by arrow 96. Repeated access to non-transparent pages in Lf are noticed by the file system enabling to move pages repeatedly accessed in Lf to the head of Lf, as demonstrated by arrow 95.

If no or little repeated access requests are made for a (now protected) page in Lout that page will eventually be moved out of Lout as demonstrated by arrow 94. Pages moved out of Lout are typically moved out of the memory, for example, into a storage device (e.g., storage device 15) and become warm data as opposed to hot data.

In these two last embodiments protection is provided for transparent pages at a point prior to being moved out of the hot data storage, thereby providing another (possibly last) chance for previously transparent pages to prove themselves as still being used before being moved out of the hot data storage.

The exemplary embodiments described in FIGS. 5-9 demonstrate how methods according to embodiments of the invention enable to effectively manage transparent pages (e.g., based on a repeated access pattern), whereas known placement and caching algorithms which are unaware of transparent pages, are unable to manage these pages.

Embodiments of the invention offer a cost effective solution that enables to combine different types of storage devices in a way that enables high performance, while accommodating to changing requirements of workloads. The use of different types of storage devices according to embodiments of the invention improves computer systems by providing low latency I/O access (e.g., improving application run time) while offering expanded physical memory space and also enabling to reduce costs due to use of cheaper storage devices partly replacing the more expensive storage devices.

What is claimed is:

1. A method, comprising:
maintaining by a processor executable, memory mapped file system a first data structure at a persistent memory having a plurality of memory pages that have been requested only once recently and a second data structure having a plurality of memory pages that have been requested more than once; wherein both the first data structure and the second data structure represent a sequence having a head and a tail;
moving by the file system, a page of the second data structure to a head of the second data structure, after the page is requested, and when the page is not requested, the page is moved towards a tail of the second data structure;
adding by the file system, a newly requested page to a head of the first data structure and then moving the newly requested page towards a tail of the first data structure, as other requested memory pages are added at the head of the first data structure;
transferring by the file system, any memory page from the first data structure to the head of the second data structure that has been requested more than once;
removing by the file system a memory page from one or both of the first data structure and the second data structure, when a free pool of pages does not have any available free memory page for any newly requested memory page; wherein memory page removal from the first data structure and the second data structure is based on one of a random policy and a round-robin policy; and wherein when any transparent page is removed from the second data structure, a transparent flag is set to protect the any removed transparent page.

2. The method of claim 1, wherein a new memory page that is added to the head of the second data structure is a transparent page that is accessible to a processor executable application directly and is transparent to the file system.

3. The method of claim 1, wherein the second data structure is used exclusively for transparent pages that move through the second data structure based on an access pattern, transparent to the file system.

4. The method of claim 1, wherein the any removed transparent page is placed within a rejected data structure and when requested again, is transferred back to the second data structure.

5. The method of claim 1, wherein size of the first data structure, the second data structure and the free pool of pages is flexible and varies based on workload request types.

6. A non-transitory, machine readable storage medium having stored thereon instructions for performing a method, comprising machine executable code which when executed by at least one machine, causes the machine to:
maintain by a processor executable, memory mapped file system a first data structure at a persistent memory having a plurality of memory pages that have been requested only once recently and a second data structure having a plurality of memory pages that have been requested more than once; wherein both the first data structure and the second data structure represent a sequence having a head and a tail;
move by the file system, a page of the second data structure to a head of the second data structure, after the page is requested, and when the page is not requested, the page is moved towards a tail of the second data structure;
add by the file system, a newly requested page to a head of the first data structure and then moving the newly requested page towards a tail of the first data structure, as other requested memory pages are added at the head of the first data structure;
transfer by the file system, any memory page from the first data structure to the head of the second data structure that has been requested more than once;
remove by the file system a memory page from one or both of the first data structure and the second data structure, when a free pool of pages does not have any available free memory page for any newly requested memory page; wherein memory page removal from the first data structure and the second data structure is based on a random policy; wherein the second data structure is used exclusively for transparent pages that move through the second data structure based on an access pattern, transparent to the file system; and wherein when any transparent page is removed from the second data structure, a transparent flag is set to protect the any removed transparent page.

7. The non-transitory, machine readable storage medium of claim 6, wherein memory page removal from the first data structure and the second data structure is based on a round-robin policy.

8. The non-transitory, machine readable storage medium of claim 6, wherein a new memory page that is added to the head of the second data structure is a transparent page that is accessible to a processor executable application directly and is transparent to the file system.

9. The non-transitory, machine readable storage medium of claim 6, wherein the any removed transparent page is placed within a third data structure and when requested again, is transferred back to the second data structure.

10. The non-transitory, machine readable storage medium of claim 6, wherein size of the first data structure, the second data structure and the free pool of pages is flexible and varies based on workload request types.

11. A system, comprising:
a memory containing machine readable medium comprising machine executable code having stored thereon instructions; and a processor coupled to the memory to execute the machine executable code to:
maintain by a memory mapped file system a first data structure at a persistent memory having a plurality of memory pages that have been requested only once recently and a second data structure having a plurality of memory pages that have been requested more than once; wherein both the first data structure and the second data structure represent a sequence having a head and a tail;
move by the file system, a page of the second data structure to a head of the second data structure, after the page is requested, and when the page is not requested, the page is moved towards a tail of the second data structure;
add by the file system, a newly requested page to a head of the first data structure and then moving the newly requested page towards a tail of the first data structure, as other requested memory pages are added at the head of the first data structure;
transfer by the file system, any memory page from the first data structure to the head of the second data structure that has been requested more than once;
remove by the file system a memory page from one or both of the first data structure and the second data structure, when a free pool of pages does not have any available free memory page for any newly requested memory page; wherein memory page removal from the first data structure and the second data structure is based on a random policy; wherein the second data structure is used exclusively for transparent pages that move through the second data structure based on an access pattern, transparent to the file system; and wherein when any transparent page is removed from the second data structure, a transparent flag is set to protect the any removed transparent page.

12. The system of claim 11, wherein memory page removal from the first data structure and the second data structure is based on a round-robin policy.

13. The system of claim 11, wherein a new memory page that is added to the head of the second data structure is a transparent page that is accessible to a processor executable application directly and is transparent to the file system.

14. The system of claim 11, wherein the any removed transparent page is placed within a third data structure and when requested again, is transferred back to the second data structure.

15. The system of claim 11, wherein size of the first data structure, the second data structure and the free pool of pages is flexible and varies based on workload request types.

* * * * *